US008858153B2

(12) United States Patent
McGrane et al.

(10) Patent No.: US 8,858,153 B2
(45) Date of Patent: Oct. 14, 2014

(54) TOP MOUNT METHOD AND SYSTEM

(76) Inventors: Barry McGrane, Clogherhead (IE); Kevin Turnbull, Knockbridge (IE); John McFadden, Anny (IE)

(*) Notice: Subject to any disclaimer, the term of this patent is extended or adjusted under 35 U.S.C. 154(b) by 1028 days.

(21) Appl. No.: 12/864,095

(22) PCT Filed: Jan. 22, 2009

(86) PCT No.: PCT/EP2009/050728
§ 371 (c)(1),
(2), (4) Date: Nov. 2, 2010

(87) PCT Pub. No.: WO2009/092767
PCT Pub. Date: Jul. 30, 2009

(65) Prior Publication Data

US 2011/0052354 A1 Mar. 3, 2011

(30) Foreign Application Priority Data

Jan. 22, 2008 (IE) .................................. S2008/0042

(51) Int. Cl.
*B60P 1/00* (2006.01)
*B66F 9/075* (2006.01)

(52) U.S. Cl.
CPC ......... *B66F 9/07563* (2013.01); *B66F 9/07581* (2013.01)
USPC ............................ 414/812; 414/462; 414/467

(58) Field of Classification Search
USPC ......... 414/427, 428, 462, 467, 563, 373, 809, 414/509, 511, 522, 525.1, 812
See application file for complete search history.

(56) References Cited

U.S. PATENT DOCUMENTS

| | | | | | |
|---|---|---|---|---|---|
| 3,422,973 | A * | 1/1969 | Longman | ...................... | 414/508 |
| 3,710,965 | A * | 1/1973 | Joosten | ........................ | 414/467 |
| 4,396,341 | A * | 8/1983 | Brouwer et al. | .............. | 414/467 |
| 4,639,181 | A * | 1/1987 | Tsubouchi | .................... | 414/349 |
| 4,859,133 | A * | 8/1989 | Maria | .......................... | 414/462 |

(Continued)

FOREIGN PATENT DOCUMENTS

| | | |
|---|---|---|
| AU | 24052 | 7/1990 |
| WO | 2008/142551 | 11/2008 |
| WO | 2008/142556 | 11/2008 |

OTHER PUBLICATIONS

International Search Report of PCT/EP2009/050728 dated Apr. 28, 2009, pp. 3.

*Primary Examiner* — James Keenan
*Assistant Examiner* — Glenn Myers
(74) *Attorney, Agent, or Firm* — Brian J. Colandreo; Jeffrey T. Placker; Holland & Knight, LLP

(57) ABSTRACT

This invention relates to a top mount method, a top mount system and a combination of forklift truck and carrying vehicle having such a top mount system. The top mount method differs from the known methods in that the forklift truck lifting assembly at least is provided with a remote control unit to permit the operator of the forklift to mount the forklift onto the carrying vehicle from a position remote from the forklift. The top mount system comprises a track having a carriage slidably mounted therein and a ram for moving the carriage relative the track. The obviates the need to use the drive of the forklift under remote operation. Finally, there is provided a combination of a forklift and a carrying vehicle having the top mount system which together provide a useful and safer alternative to the known combinations.

13 Claims, 8 Drawing Sheets

(56) References Cited

U.S. PATENT DOCUMENTS

| | | | | | |
|---|---|---|---|---|---|
| 5,582,501 | A | * | 12/1996 | Meyer | 414/491 |
| 5,775,868 | A | * | 7/1998 | Mann | 414/475 |
| 5,871,328 | A | * | 2/1999 | Pinkston | 414/477 |
| 5,989,096 | A | * | 11/1999 | Barton et al. | 446/425 |
| 6,116,843 | A | | 9/2000 | Braud | |
| 6,120,232 | A | * | 9/2000 | Dubosh et al. | 414/467 |
| 7,033,128 | B2 | * | 4/2006 | Poindexter | 414/544 |
| 7,927,061 | B2 | * | 4/2011 | Keenan et al. | 414/467 |
| 7,927,063 | B2 | * | 4/2011 | Keenan et al. | 414/812 |
| 2002/0057959 | A1 | * | 5/2002 | Karr | 414/467 |

* cited by examiner

TOP MOUNT METHOD AND SYSTEM

RELATED APPLICATIONS

The subject application is a U.S. National Stage application of International Application No. PCT/EP2009/050728, filed on 22 Jan. 2009, which claims the priority of Irish Patent Application No.: S2008/0042, filed on 22 Jan. 2008, the contents of which are herein incorporated by reference in its entirety.

INTRODUCTION

This invention relates to a method of mounting a forklift onto the bed of a carrying vehicle, a top mount system and a combination of forklift truck and carrier vehicle.

It has been known for many years that forklift trucks may be mounted onto carrying vehicles to allow delivery and collection of goods from customer's premises. The forklift truck is transported to and from the customer's premises on the carrying vehicle and once at the customer's premises the forklift truck may be dismounted from the carrying vehicle and used to load and unload goods to and from the bed of the carrying vehicle. This is known to significantly reduce the labour required to deliver or collect heavy goods in cases where the customer is not in possession of a forklift to carry out this work.

These forklifts that are carried on a carrying vehicle are commonly referred to as piggy-back forklifts and they are of necessity lightweight and highly maneuverable. Usually, these piggy-back forklift trucks are mounted on the rear of a carrying vehicle and overhang a short distance from the rear of a carrying vehicle. However, the amount of overhang allowed for carried forklifts is restricted in many countries and in some countries it is not permissible to have any overhang beyond the rear of the carrying vehicle itself. Therefore, in some jurisdictions, in order to provide a piggy-back forklift truck for use in loading and unloading goods on a customer's premises, it is necessary to mount the entire piggy-back forklift truck up onto the bed of the carrying vehicle. In other circumstances, it may also be desirable to mount the forklift truck on the bed of the carrying vehicle. There are however numerous disadvantages of the known ways of achieving this.

First of all, using the known methods and top mount systems for mounting a forklift truck onto the bed of a carrying vehicle, it is necessary for the operator of the forklift to remain in the driver's cab of the forklift while the forklift is being raised up onto the bed of the carrying vehicle. This is undesirable as the operator of the forklift truck will be at significant height in the driver's cab when the forklift is in a fully raised position and should the driver fall from the driver's cab they will almost certainly suffer serious injury. Secondly, it is necessary for the operator of the forklift to climb down from the forklift driver's cab onto the bed of the vehicle and then climb down from the bed of the vehicle onto the ground once any connecting straps or chains have been attached to the forklift on the bed of the carrying vehicle. Again, the operator of the forklift will be working at height and this is undesirable. The same risks apply during the dismounting of the forklift from the bed of the carrying vehicle. Finally, the existing system and method require considerable skill for the operator to be able to mount the forklift on the chassis and it is desirable to have an easier method and system for mounting the forklift on the carrying vehicle chassis.

It is an object therefore of the present invention to provide an alternative method of mounting a forklift onto the bed of a carrying vehicle, a top mount system and a combination of forklift truck and carrying vehicle that obviate at least some of the problems with the known methods, systems and combinations. It is a further object of the present invention to provide a useful alternative to the existing method, system and combination of forklift truck and carrying vehicle.

STATEMENTS OF INVENTION

According to the invention there is provided a method of mounting a forklift truck onto the bed of a carrying vehicle, the bed of the carrying vehicle having a top mount system comprising a track having a carriage slidably mounted thereon, the forklift comprising a lifting assembly carrying forks, the lifting assembly having means to raise and lower the forks, and a remote control unit to operate the lifting assembly from a position remote from the forklift, the method comprising the steps of:

- engaging the carriage with the lifting assembly thereby securing the forklift to the carriage;
- from a position remote from the forklift truck, using the remote control unit to raise the forklift truck relative the carrying vehicle by lowering the forks on the lifting assembly; and
- pulling the forklift onto the bed of the carrying vehicle by sliding the carriage along the track.

By having such a method, it is possible for the operator of the forklift to mount the forklift onto the bed of the carrying vehicle from a position on the ground beside the forklift. The remote control unit can operate the lifting assembly to pull the forklift up so that the wheels of the forklift truck are above or substantially in line with the bed of the forklift truck. The forklift is then moved fully onto the bed of the carrying vehicle by sliding the carriage along the track. Once the forks have engaged the carriage, the operator of the forklift truck may alight from the forklift and carry out the remaining steps from a position remote from the forklift and therefore the operator will at no stage be in the highly elevated position on the bed of the carrying vehicle or in the driver's cab of the forklift above the bed of the carrying vehicle. Therefore, the method according to the present invention does not require the operator to work at a height in order to mount the forklift which is desirable.

In one embodiment of the invention there is provided a method in which the lifting assembly has means to extend and retract the reach of the forks and in which the step of pulling the forklift onto the bed of the carrying vehicle further comprises using the remote control unit to retract the forks.

In one embodiment of the invention there is provided a method in which the step of sliding the carriage along the track comprises using a hydraulic ram, mounted on the bed of the carrying vehicle and connected to the carriage, to move the carriage along the track.

In one embodiment of the invention there is provided a method comprising the intermediate step of connecting a hydraulic fluid supply of the forklift to the hydraulic ram connected to the carriage.

In one embodiment of the invention there is provided a method in which the remote control unit further comprises means to operate a drive unit of the forklift and the step of pulling the forklift onto the bed of the carrying vehicle by sliding the carriage along the track further comprises using the remote control unit to operate the drive unit of the forklift and drive the forklift across the bed of the carrying vehicle.

In one embodiment of the invention there is provided a method comprising the additional step of connecting fixing members between the forklift and the bed of the carrying vehicle.

In one embodiment of the invention there is provided a top mount system for mounting on the bed of a carrying vehicle chassis comprising a track and a carriage slidably mounted in the track, characterised in that: there is further provided a ram connected at one end to the carriage and at the other end to the track, the ram being operable to slide the carriage back and forth along the track.

In one embodiment of the invention there is provided a top mount system in which the ram is a hydraulic ram. In one embodiment of the invention there is provided a top mount system in which the hydraulic ram is provided with at least one hydraulic fluid coupling for connection to a complimentary hydraulic fluid coupling of a hydraulic fluid supply of a forklift. In one embodiment of the invention there is provided a top mount system in which the hydraulic fluid couplings are quick-release couplings.

In one embodiment of the invention there is provided a top mount system in which the carriage is dimensioned to releasably engage both of a pair of forks and a fork carriage of a forklift. Alternatively, the carriage is dimensioned to receive a fork carriage. In another alternative, the fork carriage is dimensioned to receive a loading bucket.

In one embodiment of the invention there is provided a top mount system in which instead of being connected to the track, the other end of the ram is connected directly to the bed of the carrying vehicle.

In one embodiment of the invention there is provided, in combination,

- a forklift truck comprising:
  - a chassis;
  - a pair of front wheels and at least one rear wheel;
  - a drive unit mounted on the chassis;
  - a lifting assembly mounted on the chassis, the lifting assembly having a pair of forks mounted on the lifting assembly and means to raise and lower the forks;
  - a remote control unit to operate the lifting assembly from a position remote from the forklift truck; and
- a carrying vehicle comprising:
  - a chassis having a chassis bed;
  - a top mount system mounted on the chassis bed, the top mount system comprising a track mounted on the bed and a carriage slidable in the track;
- and in which one of the forklift and the carrying vehicle comprise means to slide the carriage back and forth along the track.

In one embodiment of the invention there is provided a combination in which the lifting assembly has means to extend and retract the reach of the forks.

In one embodiment of the invention there is provided a combination in which the remote control unit further comprises means to operate the drive unit of the forklift.

In one embodiment of the invention there is provided a combination in which the carrying vehicle has the means to slide the carriage along the track, the means comprising a ram, connected at one end to the carriage and at the other end to the track.

In one embodiment of the invention there is provided a combination in which in which instead of being connected to the track, the other end of the ram is connected directly to the bed of the carrying vehicle. In one embodiment of the invention there is provided a combination in which the ram is a hydraulic ram.

In one embodiment of the invention there is provided a combination in which the hydraulic ram is provided with at least one hydraulic fluid coupling for connection to a complimentary hydraulic fluid coupling of a hydraulic fluid supply of the forklift.

In one embodiment of the invention there is provided a combination in which the hydraulic fluid couplings are quick-release couplings.

In one embodiment of the invention there is provided a combination in which the carriage is dimensioned to releasably engage both of a pair of forks and a fork carriage of a forklift.

In one embodiment of the invention there is provided a combination wherein there are provided fixing members for connecting the forklift to the bed of the carrying vehicle.

DETAILED DESCRIPTION OF THE INVENTION

The invention will now be more clearly understood from the following description of some embodiments thereof, given by way of example only with reference to the accompanying drawings, in which:

FIGS. 1(*a*) to 1(*d*) inclusive are side views of sequential stages of a method of dismounting a forklift from the bed of a carrying vehicle known in the art;

FIGS. 2(*a*) to 2(*d*) inclusive are side views showing the sequential steps of dismounting a forklift from the bed of a carrying vehicle according to the present invention;

Figure 1A:
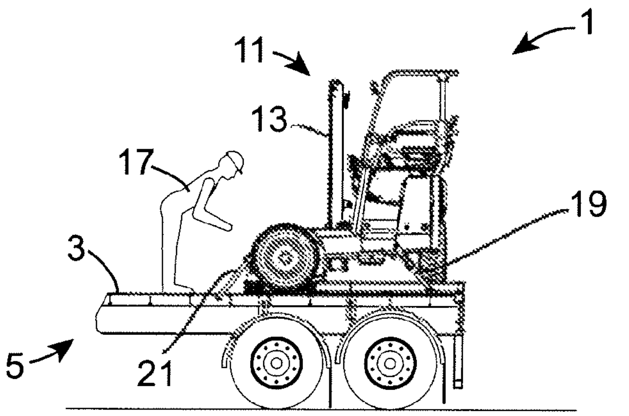
(Prior Art) Fig. 1(a)
Figure 1B:
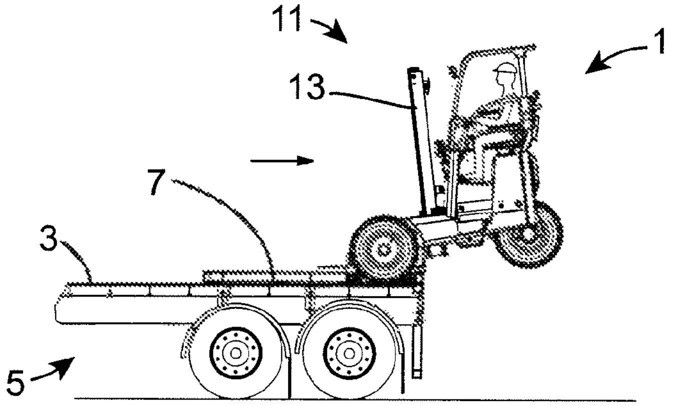
Figure 1C:
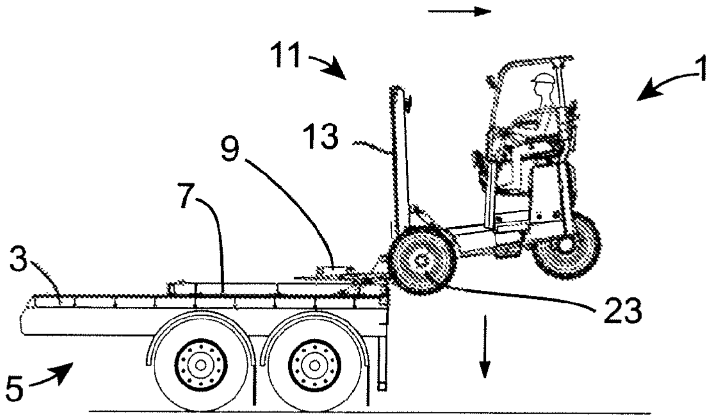
Figure 1D:
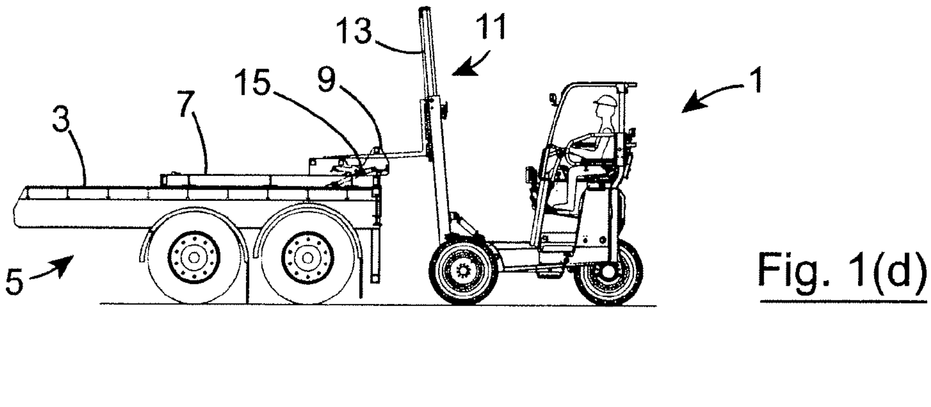
Figure 2A:
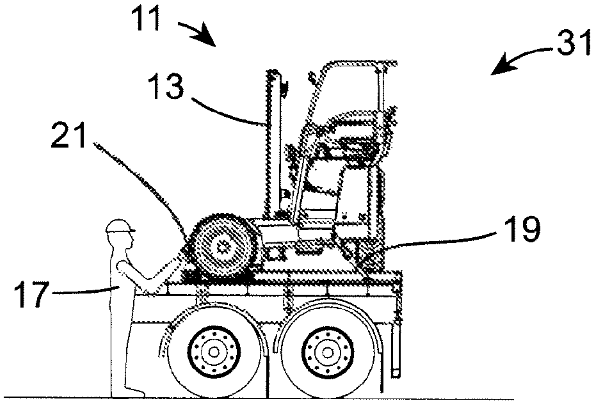
Figure 2B:
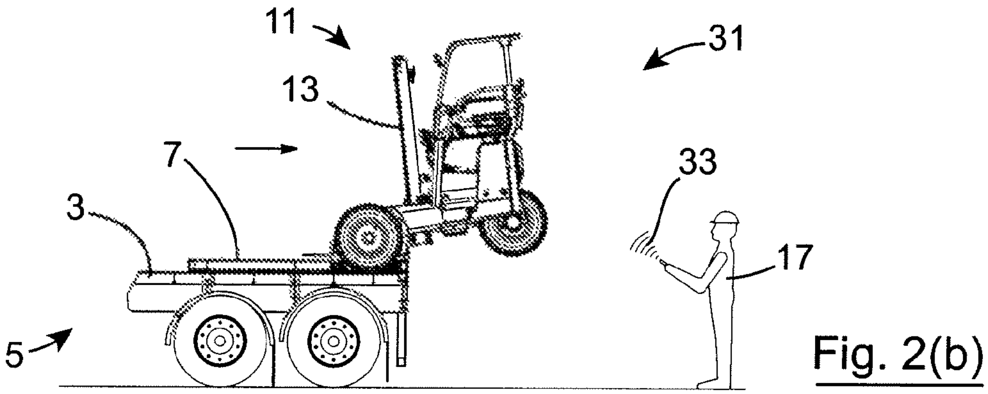
Figure 2C:
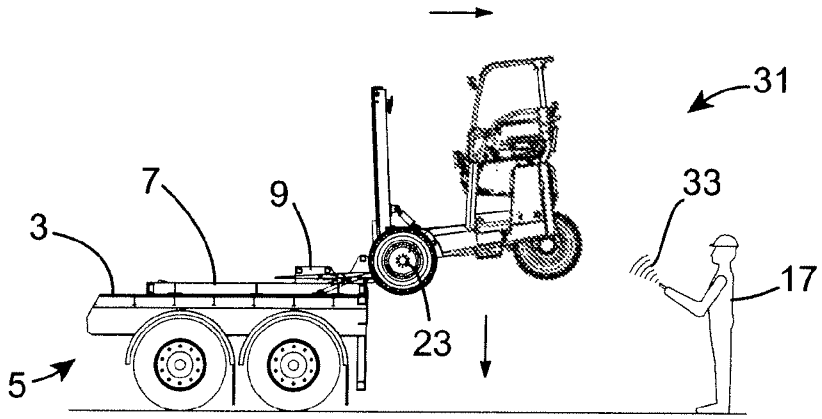
Figure 2D:
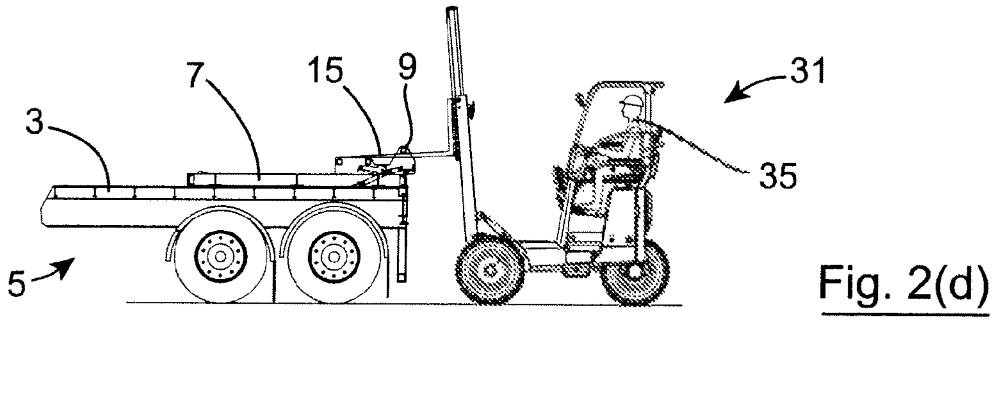

Referring to FIGS. 1(*a*) to 1(*d*) inclusive of the drawings there is shown a method of dismounting a forklift truck, indicated generally by the reference numeral 1, from the bed 3 of a carrying vehicle, indicated generally by the reference numeral 5. The bed 3 of the carrying vehicle 5 has a top mount system comprising a track 7 mounted thereon and a carriage 9 slidably mounted in the track 7. The forklift 1 comprises a lifting assembly 11, in this case an upright mast 13 carrying forks 15. The lifting assembly 11 has means (not shown) to move the forks 15 up and down relative the forklift 1 as well as means (not shown) to extend and retract the forks 15 relative the forklift 1.

In use, an operator 17 climbs onto the bed 3 of the carrying vehicle 5 and undoes any chains 19, or straps 21, or other fixing members connecting the forklift 1 to the bed 3 of the carrying vehicle 5. Once the fixing members have been removed, the operator 17 climbs up into the driver's cab of the forklift, starts the drive unit (not shown) of the forklift and drives the front wheels of the forklift 1 backwards thereby reversing the forklift 1 off the back of the carrying vehicle 5 to the position shown in FIG. 1(*b*). The forklift 1 is held in an elevated position shown in FIG. 1(*b*) by virtue of the fact that the forks 15 are engaged in the carriage 9 of the top mount system. At this stage the weight of the forklift is on the front wheels and the forks 15.

In order to move the forklift further rearwards of the carrying vehicle so that the front wheels 23 of the forklift are free of the bed of the carrying vehicle, the operator of the forklift extends the forks which in this case comprises moving the entire upright mast 13 forwards on the forklift chassis. The upright mast 13 is in fact mounted on a mast carriage (not shown) which is in turn slidably mounted on the forklift chassis and a mast carriage ram is provided to move the mast carriage, and as a consequence the entire lifting assembly and forks, forward and backwards on the forklift chassis. When the forks are fully extended the front wheels 23 of the forklift will be free of the bed of the trailer as shown in FIG. 1(*c*). Once in this position, the operator then lowers the forklift truck by raising the forks 15 up the mast. As the forks are still engaged in the carriage 9, this has the effect of lowering the forklift 1. When on the ground, the operator 17 then disengages the forks from the carriage 9 by tilting the mast forwards and reversing the forklift away from the carrying vehicle. The lifting assembly is pivotally mounted on the mast carriage and a tilt ram is provided to tilt the lifting assembly forward and backwards on the mast carriage. The forklift is then available for use in the transportation of goods to and from the carrying vehicle chassis.

In order to mount the forklift 1 back onto the bed 3 of the carrying vehicle 5, the steps outlined above are reversed. First of all, the operator of the forklift offers the forks 15 up to the carriage 9 and secures the forks in the carriage 9 by tilting the mast backwards. Once the forks have engaged the carriage 9, the operator lowers the forks 15 on the mast 13 thereby causing the forklift 1 to rise upwards until the front wheels 23 are in a position above the bed 3 of the trailer (as shown in FIG. 1(*c*)). The forks 15 are then retracted relative the chassis by drawing the mast 13 back along the carriage of the forklift until the front wheels 23 are on the bed 3 of the carrying vehicle 5 (as shown in FIG. 1(*b*)) and the front wheels 23 are then driven moving the forklift further onto the bed of the carrying vehicle by sliding the carriage 9 along the tracks 7. Once in loaded position (as shown in FIG. 1(*a*)), the operator depressurises the hydraulics of the forklift, applies the brake, turns off the drive unit and then climbs out of the driver's cab onto the bed 3 of the carrying vehicle 5. Once on the bed of the carrying vehicle, the operator secures any chains 19 or straps 21 in position and dismounts from the bed 3 of the carrying vehicle 5. It can be seen that throughout the mounting and dismounting operations known in the art, the operator is in an elevated position both in the cab and on the bed of the carrying vehicle for a significant period of time. This is highly undesirable, Referring now to FIGS. 2(*a*) to 2(*d*) of the drawings, there are shown side views of the sequential steps taken to dismount a forklift truck, indicated generally by the reference numeral 31, from a bed 3 of a carrying vehicle 5 using the method according to the present invention. Referring specifically to FIG. 2(*a*), the operator 17 detaches any chains 19 and straps 21 securing the forklift to the bed of the carrying vehicle from a position on the ground beside the trailer. The operator 17, from a position on the ground beside the forklift, then uses a remote control unit 33 to operate the forklift lifting assembly 11 and one of a drive unit of the forklift (not shown) and a hydraulic cylinder connected to the carriage 9 of the top mount system to move the forklift from a position shown in FIG. 2(*a*) to a position on the ground similar to that shown in FIG. 2(*d*).

In the first embodiment, the operator will start the drive unit of the piggy-back forklift which may have very limited functionality when operated by the remote control unit 33 to allow a certain number of rotations of the front wheels, to reverse the piggyback forklift truck to the position shown in FIG. 2(*b*). In the second, preferred embodiment, a hydraulic ram is provided connected to the carriage 9 at one of its ends and to the track 7 at the other of its ends. The ram is operated to pull the carriage 9 rearwards along the track 7 towards the rear of the carrying vehicle which has the direct effect of pushing the forklift 31 to the position shown in FIG. 2(*b*) from the position shown in FIG. 2(*a*).

Once in the position shown in FIG. 2(*b*), the operator 17 then uses the remote control to extend the reach of the forks 15 by moving the upright mast 13 of the lifting assembly 11 forwards along the chassis of the forklift truck. This results in the front wheels 23 of the forklift 31 being moved rearwards of the bed 3 of the carrying vehicle 5 to the position shown in FIG. 2(*c*). In order to operate the hydraulic ram used to move the lifting assembly forwards along the forklift chassis, it may be necessary to start up the drive unit of the forklift truck to provide power to the hydraulics. Therefore, an ignition switch operable to turn the drive unit of the forklift truck on and off is provided on the remote control unit 33. Again, if the drive unit is started using this ignition switch, it is preferred that only limited functionality of the forklift is provided, for example, only the operation of the lifting assembly components is permitted. It would be understood by one skilled in the art how such limitations could be imposed on the forklift operation.

Once in the position shown in FIG. 2(*c*) with the front wheels 23 free of the bed 3 of the carrying vehicle 5, the operator 17 then further operates the lifting assembly to raise the forks 15 on the upright mast 13 until the forklift 31 is on the ground (adjacent the position shown in FIG. 2(*d*) where the forklift has already been reversed slightly away from the rear of the carrying vehicle chassis). Once on the ground, the operator 17 mounts the forklift truck getting into the driver's cab 35, disengages the forks 15 from the carriage 9 by tilting the mast forwards and drives the forklift 31 away.

It will be understood that in order to mount the forklift 31 onto the carrying vehicle 5, the above mentioned steps are effectively performed in reverse. First of all, the operator 17 of the forklift drives the forklift and offers the forks 15 up to the carriage 9 of the top mount system (FIG. 2(*d*)). The forks 15 are engaged in the carriage 9 and the mast is tilted backwards. The operator 17 of the forklift alights from the forklift 31 with the remote control unit 33. The operator 17 thereafter uses the remote control unit 33 to lower the forks on the mast which causes the forklift to be raised relative the carrying vehicle 5 to the position shown in FIG. 2(*c*). As the forks are engaged in the carriage 9, they cannot move lower and therefore cause the forklift to be raised up to this position. Once the wheels 23 of the forklift 31 are at a level above the bed 3 of the carrying vehicle 5 (as shown in FIG. 2(*c*)), the upright mast 13 is retracted along the carriage which has the effect of drawing the chassis of the forklift forwards and the wheels of the forklift onto the bed of the carrying vehicle (as shown in FIG. 2(*b*)).

In a first embodiment, the operator 17 can then use the drive unit of the piggy-back forklift to drive the forklift forwards thereby sliding the carriage 9 along the track 7 and moving the forklift onto the bed of the carrying vehicle to the position shown in FIG. 2(*a*). Alternatively, and more preferably, in a second embodiment the operator 17 will use the remote control unit 33 to operate a hydraulic ram (not shown) connected to the carriage 9 to push the carriage 9 forwards along the track 7 and hence cause the forklift to be pulled from the position shown in FIG. 2(*b*) to the position mounted on the bed of the carrying vehicle shown in FIG. 2(*a*). Once in position shown in FIG. 2(*a*), the operator can use the ignition switch on the remote control unit 33 to depower the drive unit and depressurise the hydraulics of the forklift. The operator 17 can then attach any chains or straps from a position on the ground beside the bed of the carrying vehicle.

It is envisaged that in an alternative embodiment of the invention, a separate power supply may be provided for the hydraulic ram which may if desired be operated independent of the remote control unit 33 and a separate control pad could be provided and a separate fluid supply could be provided for the hydraulic ram to move the carriage 9 along the track 7. In the preferred embodiment, the hydraulic fluid supply of the piggy-back forklift is connected to the hydraulic ram on the carrier vehicle chassis and used to move the carriage along the track.

Figure 3:
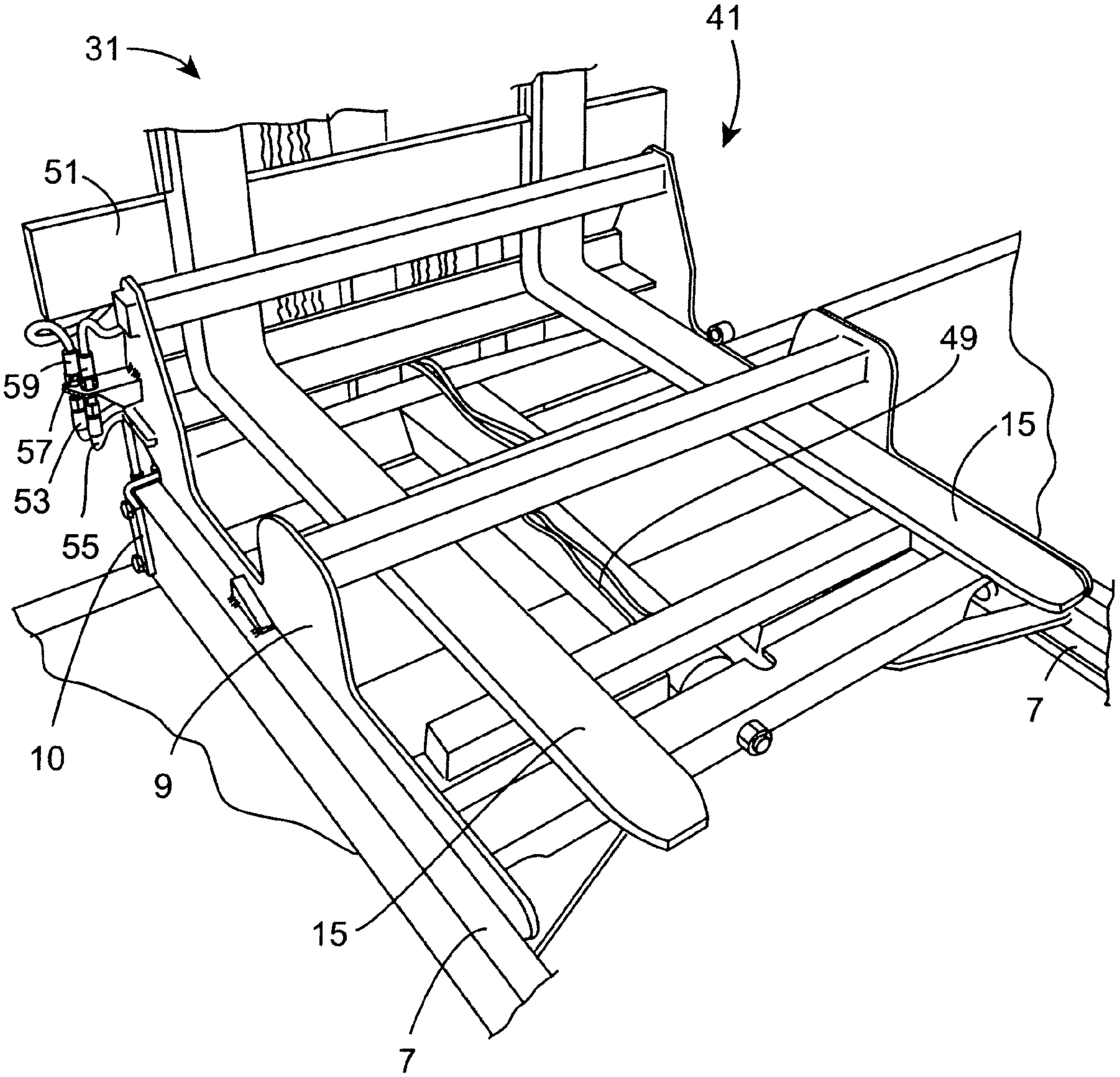
FIG. 3 is a partial perspective view of a top mount system according to the invention engaged by a lifting assembly.

Referring to FIG. 3 of the drawings there is shown a partial perspective view of the top mount system according to the present invention, indicated generally by the reference numeral 41, being engaged by the lifting assembly 11 of a forklift 31. The top mount system 41 comprises a track 7, which is secured to the bed 5 of the carrying vehicle, and a carriage 9 slidably mounted in the track 7. A hydraulic ram 49 is connected to the carriage 9 at one end and is fixed to an end plate 10 of the track at its other end. The carriage 9 is moved forwards and backwards along the track 7 by extending or retracting the hydraulic ram 49.

In the embodiment shown, the forks 15 of a forklift 31 are engaged in the carriage 9 but alternatively the fork carriage 51 of the forklift 31 could be used to engage the carriage 9 of the top mount system 41. The top mount system 41 further comprises a pair of hydraulic couplings 53, 55 for connection to a pair of complementary couplings 57, 59 of the hydraulic fluid supply of the forklift. Preferably, the couplings are quick release couplings. The hydraulic fluid supply of the forklift may therefore be used to power the hydraulic ram 49 to move the carriage 9 along the track 7 by connecting the pair of hydraulic couplings 53, 55 to the pair of complementary couplings 57, 59 of the hydraulic fluid supply of the forklift. Alternatively, a separate hydraulic power supply or fluid supply and control pad could be provided on the bed of the carrying vehicle dedicated to the top mount system 41 so that it is not dependent on the hydraulic fluid supply of the forklift 31. It is envisaged that other mechanical arrangements could be used in place of the hydraulic ram 49 if desired. For example, a motorised winch or equivalent could be used to move the carriage along the track.

Figure 4:
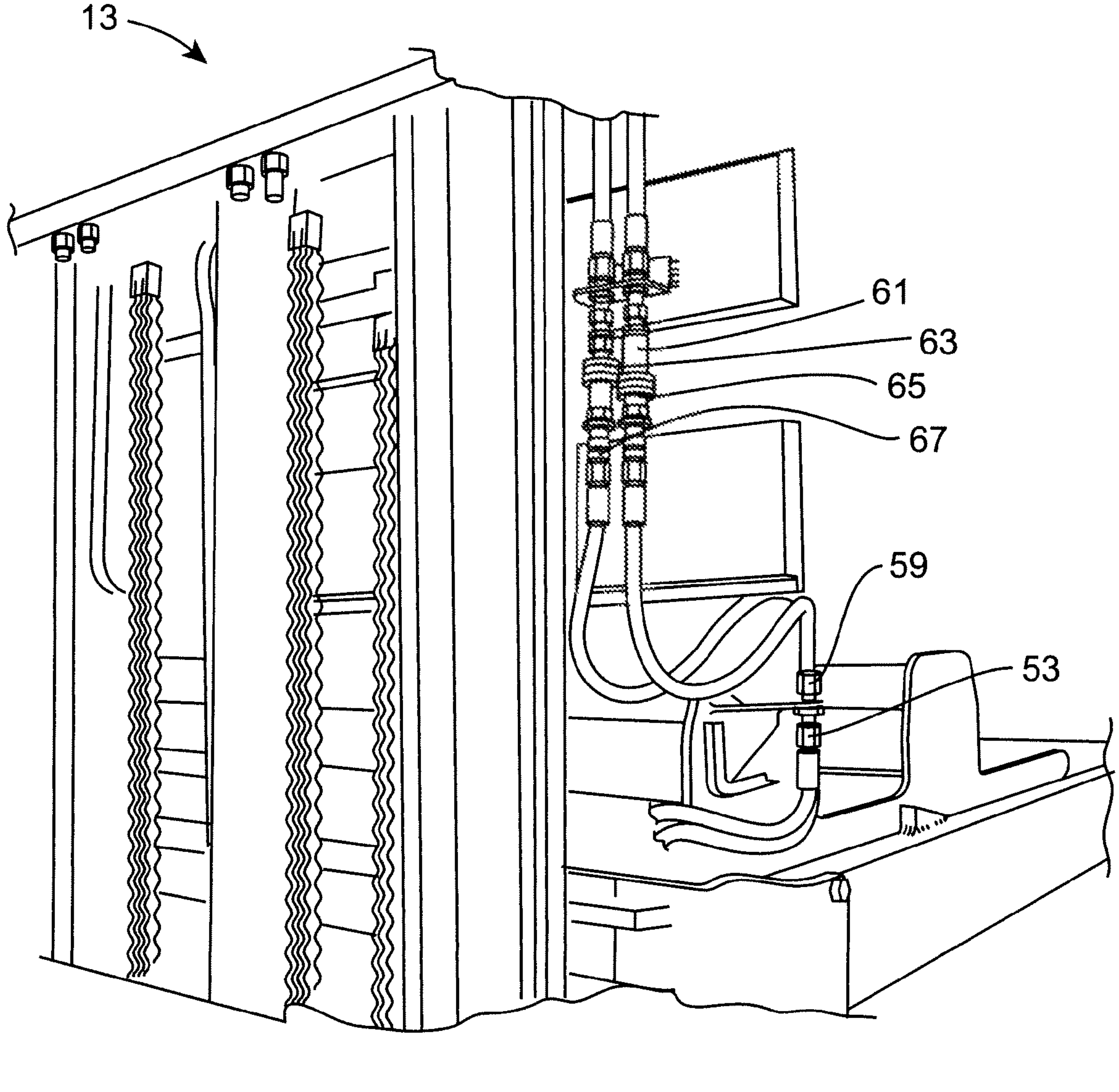
FIG. 4 is a partial rear perspective view of the top mount system shown in FIG. 3 being engaged by a lifting assembly.

Referring to FIG. 4 of the drawings there is shown a rear perspective view of the upright mast 13 of the forklift 31 and the quick-release couplings 59 connected to the quick-release coupling 53 the top mount system. Further couplings 61, 63, 65, 67 on the mast 13 are provided. For the particular arrangement shown in FIGS. 3 and 4, the method comprises the additional step of the operator (not shown) dismounting from his driver's cab when he has introduced the forks 15 into the carriage 9 and connecting the quick-release couplings 53, 55 of the top mount system 41 to the quick-release couplings 57, 59 respectively of the hydraulic fluid supply of the piggy-back forklift 31. The operator may then rely solely on the hydraulic fluid supply of the piggyback forklift to raise the forklift up to a position in line with the bed of the carrying vehicle, pull the front wheels of the forklift onto the bed of the carrying vehicle by retracting the mast, again using the hydraulics of the forklift, and finally using the hydraulics of the forklift to operate the hydraulic ram 49 to pull the carriage across and the forklift fully onto the carrying vehicle by pulling the carriage 9 across the tracks 7.

Figure 5:
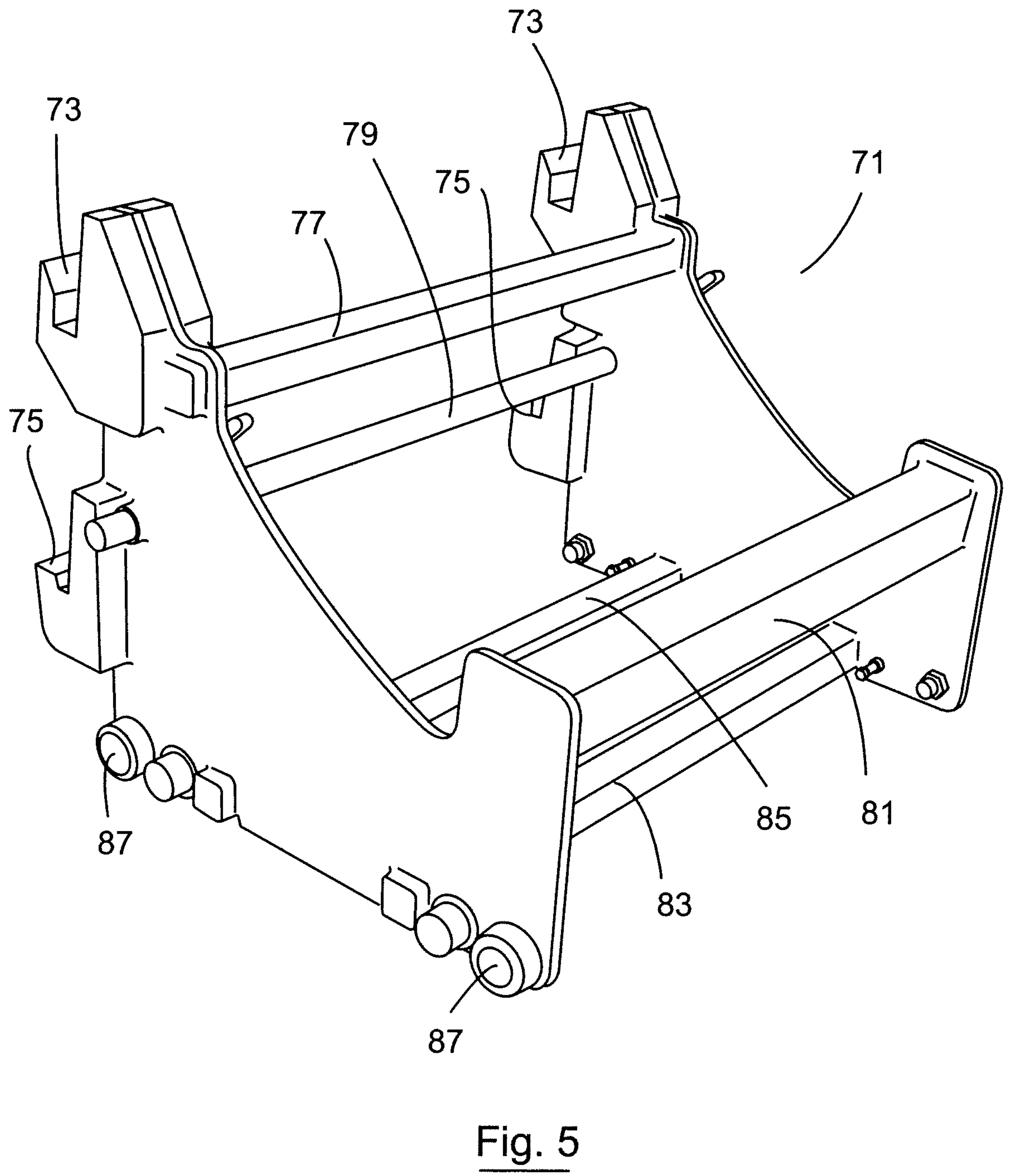
FIG. 5 is a perspective view of an alternative construction of carriage of the top mount system.

Referring to FIG. 5, there is shown an alternative construction of top mount carriage for mounting on the frame, indicated generally by the reference numeral 71. The carriage 71 comprises a frame having a plurality of upwardly opening jaws 73, 75, suitable for receiving a fork carriage therein. The top mount carriage 71 further comprises a plurality of cross bars 77, 79, 81, 83, 85 for securing the forks (not shown) of a forklift. Finally, the carriage 71 comprises a plurality of rollers 87 for mounting in a track of a top mount system (not shown).

Figure 6:
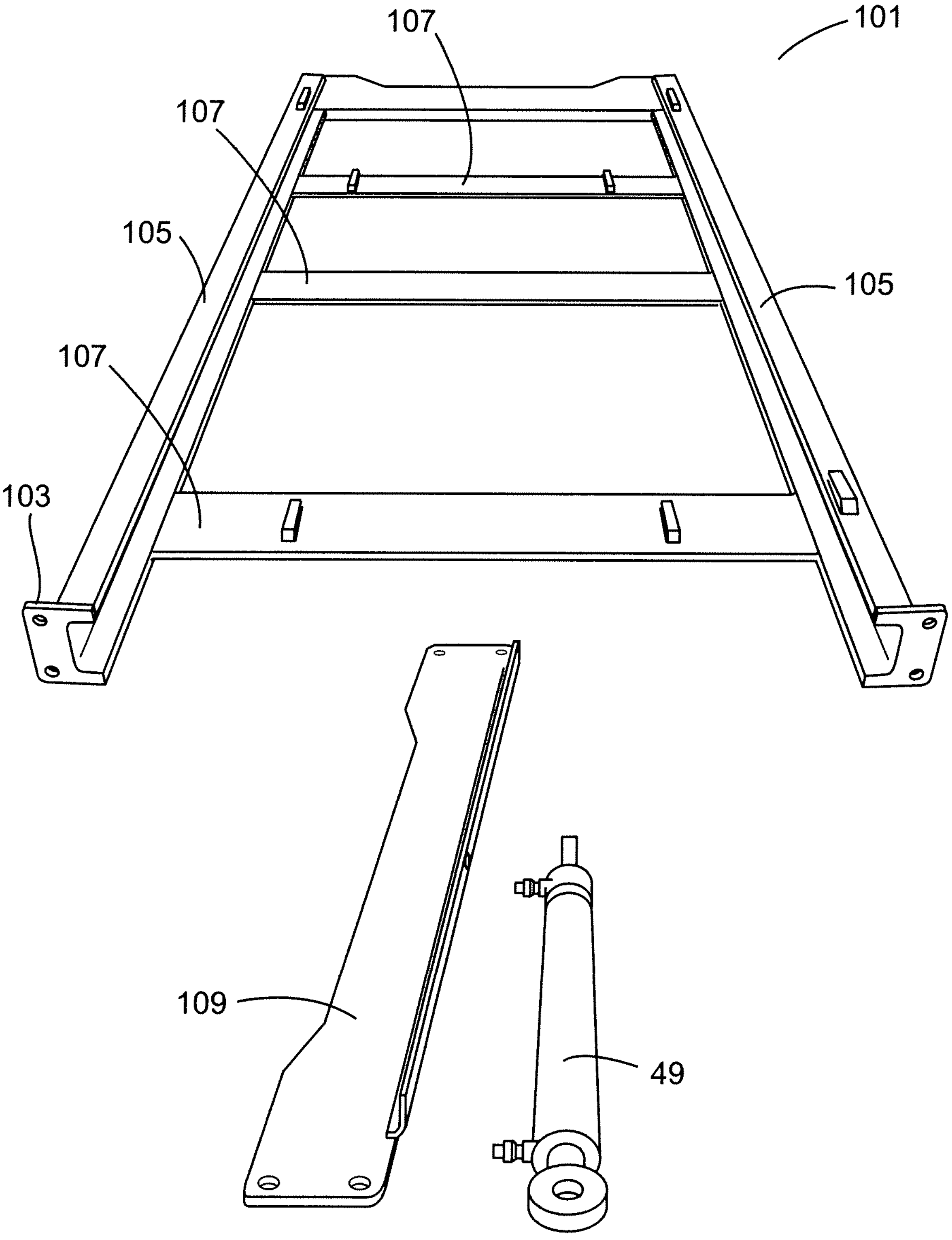
FIG. 6 is a perspective exploded view of an alternative construction of track of the top mount system.

Referring to FIG. 6, there is shown an exploded view of an alternative construction of track, indicated generally by the reference numeral 101 comprising a pair of elongate parallel carriage receiving track portions 105 each terminating in an end flange 103. The track 101 further comprises a plurality of cross members 107 connecting the two elongate parallel track portions, a hydraulic ram 49 and an end plate 109 which in use is mounted onto the end flange by bolting or other suitable connection means such as welding.

Figure 7:
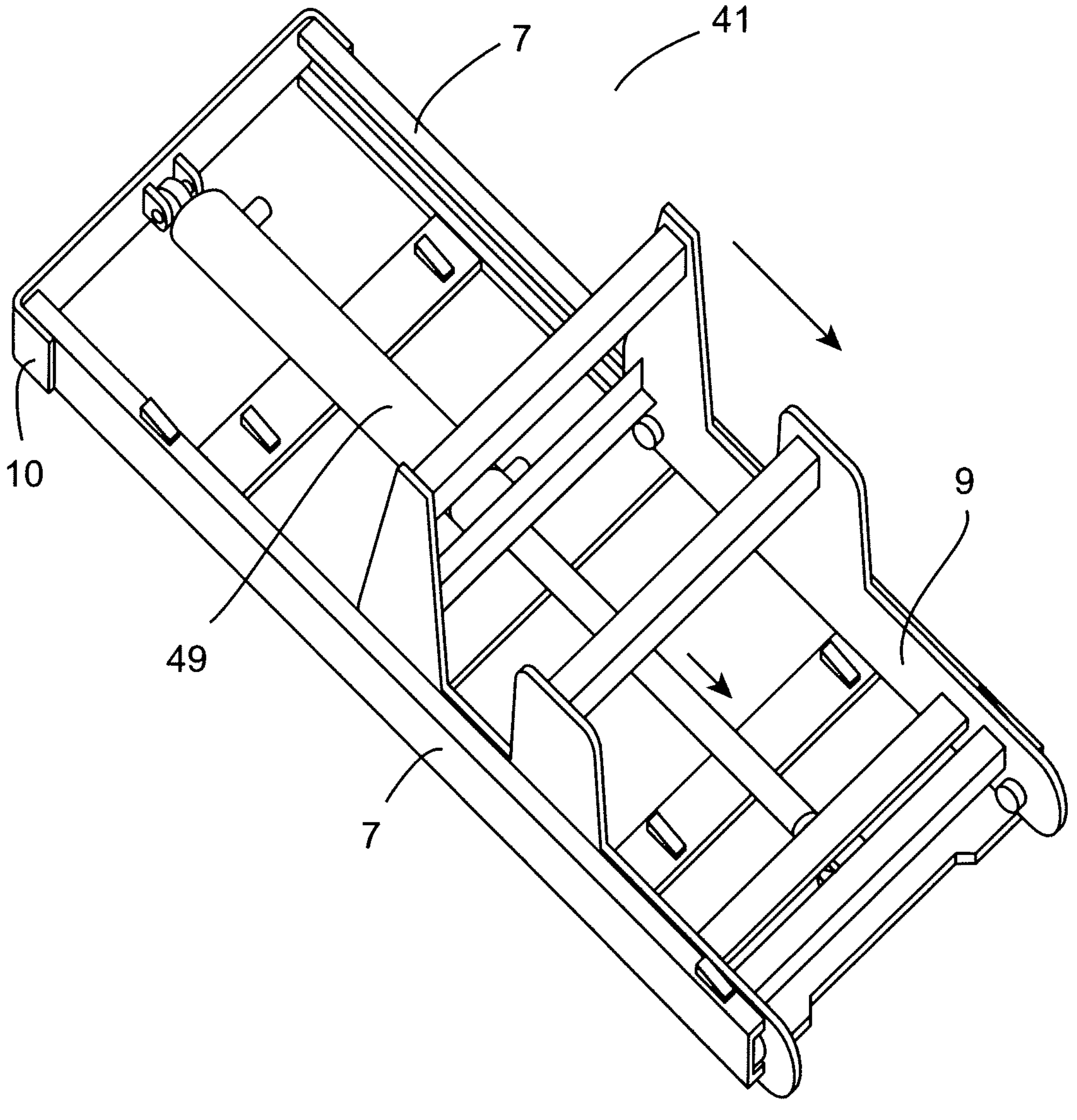
FIG. 7 is a perspective view of the top mount system according to the invention with the ram fully extended.
Figure 8:
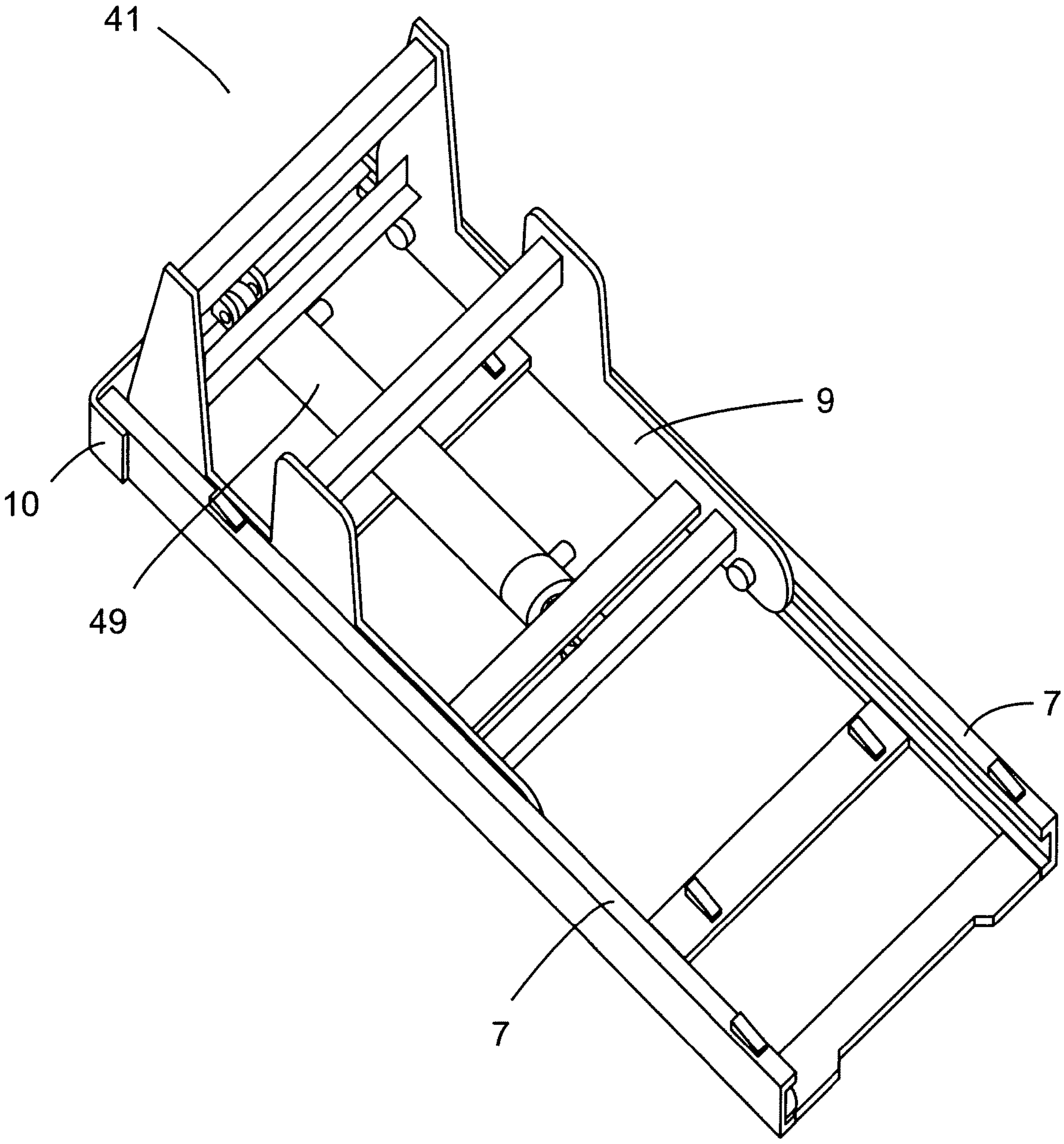
FIG. 8 is a perspective view of the top mount system according to the invention with the ram fully contracted.

Referring to FIGS. 7 and 8, there are shown perspective views of the top mount system according to the invention without a forklift truck engaging the system. The top mount system, indicated by the reference numeral 41, comprises a track 7 having a pair of elongate, parallel track portions, an end plate 10 bolted onto one end of the track portions, a carriage 9 mounted on rollers (not shown) on the track 7 and a hydraulic ram 49 mounted at one end to the carriage 9 and at its other end to the end plate 10 of the track 7. The hydraulic ram is shown in a fully extended configuration in FIG. 7 and it can be seen that the carriage is all the way towards the end of the track remote from the end plate 10. In FIG. 8, the hydraulic ram is shown in a fully contracted configuration and it can be seen that the carriage is all the way towards the end of the track 7 proximal the end plate 10. Therefore, operation of the hydraulic ram causes the carriage 9 to move back and forth along the track depending on whether the ram is being contracted or expanded.

In the embodiment shown, the forklift truck is a piggyback forklift truck having a u-shaped chassis with a pair of front wheels and at least one steerable rear wheel. The u-shaped chassis has a rear cross bar and a pair of forwardly projecting side bars. The forklift truck further comprises a drive unit, a drivers station and a lifting assembly, comprising a vertical mast, all of which are mounted on the chassis. Other load handling units such as a pivoting boom arrangement could be used instead of the upright mast on the forklift without departing from the scope of the invention.

It will be understood that various other modifications could be made to the invention without departing from the scope of the invention. For example, the remote control 33 used by the operator 17 is shown as a wireless remote control, but it could in fact be a wired control keypad connected to the main controls of the forklift. Furthermore, it is envisaged that it is preferable not to have remote operation of the drive unit of the forklift and instead the operation using the hydraulic fluid supply to operate a ram is seen as preferred. The drive unit may however have to be powered up in order to allow operation of the lifting assembly to power various hydraulic pumps, but in such a case, it is envisaged that various functionality of the drive unit could be disengaged by, for example, engaging the brake of the piggy-back forklift to prevent inadvertent drive of the wheels when the piggy-back forklift is being operated from a remote position.

In order to implement safety restrictions over the operation of the forklift drive unit, it is envisaged that a separate ignition button could be provided for the forklift either on the remote control unit 33, the side of the forklift truck in a position accessible from the ground when the forklift is mounted on the carrying vehicle chassis or a combination of on the remote control unit and on the side of the forklift. When the forklift is started using one or more of these ignition buttons the brake will be engaged and various functionality of the drive unit will be disengaged thereby providing a safer method and forklift to operate. Safety release controls may be provided in the drivers cab so that once the driver gets into the forklift after it has been dismounted from the carrying vehicle chassis, the safety mechanisms mentioned above may be turned off to allow the operator in the drivers cab have full control over the forklifts functionality. It will be understood that the ignition buttons described above may also be used to turn the drive unit off as well as on so that once the operator has mounted the forklift onto a carrying vehicle chassis, the drive unit may be turned off without the operator having to get up into the forklift when it is in an elevated position on the carrying vehicle.

Furthermore, in the embodiments shown, the top mount system is shown mounting a forklift off the rear of a vehicle but it will be understood that the top mount system could equally well be mounted on the chassis in a direction transverse to the longitudinal axis of the carrying chassis to mount and dismount the forklift over the side of the carrying vehicle chassis as opposed to the rear of the chassis. In this configuration, the forklift may take up less useable space on the carrying vehicle chassis. In certain embodiments, it may be preferable to raise the forklift slightly above the level of the bed of the chassis using the remote control operation of the lifting assembly before trying to move the forklift forwards or backwards on the chassis using the hydraulic ram 49 in order to reduce resistance to movement of the forklift. It is envisaged that the carriage and or the forks could be provided with locking members to secure the forks in position relative the carriage.

In the embodiments shown, only a vertical mast, otherwise referred to in the industry as a static mast, has been used however other lifting assemblies and mounting arrangements such as pivoting booms could also benefit from the top mount system, method and combination. It is envisaged that other constructions of slidable carriage that engage other types of load handling gear, such as carriages and buckets, other than forks could be provided if desired. What is important is that the operator is able to operate the lifting assembly from a position remote from the vehicle.

The means to extend and retract the reach of the forks for a static mast will usually entail a mast carriage ram that can move the entire mast forwards and backwards on the forklift chassis however other arrangements such as extensible forks, pantograph linkages and the like could be provided to extend and retract the forks if desired. Furthermore, in a pivoting boom arrangement, extension and retraction of the forks will comprise extending and retracting the pivoting boom. The means to raise and lower the forks will be a hydraulic mast cylinder for the static mast configuration and a pivoting cylinder for the pivoting mast configuration.

In addition to the above, it is envisaged that the top mount method and system described could be used in conjunction with vehicles other than forklift trucks described above and in particular those vehicles with a load handling attachment that will allow the vehicle to be raised up relative the carrying vehicle chassis. For example, standard forklifts or other machines with load handling equipment could be mounted onto the chassis with such a top mount system provided that the load handling equipment is sufficient to bear the weight of the vehicle and the dimensions of the vehicle permit mounting on the bed of a carrying vehicle.

In the specification the terms “comprise, comprises, comprised and comprising” or any variation thereof and the terms “include, includes, included and including” or any variation thereof are considered to be totally interchangeable and they should all be afforded the widest possible interpretation.

The invention is not limited to the embodiments hereinbefore described which may be varied in both construction and detail with the scope of the appended claims.

The invention claimed is:

1. A method of mounting a forklift truck onto a bed of a carrying vehicle, the bed of the carrying vehicle having a top mount system comprising a track having a carriage slidably mounted thereon, the forklift comprising a lifting assembly carrying forks, the lifting assembly having means to raise and lower the forks, and the lifting assembly having means to extend and retract a reach of the forks, and a remote control unit to operate the lifting assembly from a position remote from the forklift, the method comprising:
- engaging the carriage with the lifting assembly thereby securing the forklift to the carriage;
- from a position remote from the forklift truck, using the remote control unit to raise the forklift truck relative the carrying vehicle by lowering the forks on the lifting assembly; and
- pulling the forklift onto the bed of the carrying vehicle by sliding the carriage along the track, wherein pulling the forklift onto the bed of the carrying vehicle comprises using the remote control unit to retract the forks.

2. A method as claimed in claim 1 in which sliding the carriage along the track comprises using a hydraulic ram, mounted on the bed of the carrying vehicle and connected to the carriage, to move the carriage along the track.

3. A method as claimed in claim 2 in which the method further comprises connecting a hydraulic fluid supply of the forklift to the hydraulic ram connected to the carriage.

4. A method as claimed in claim 1 in which the remote control unit further comprises means to operate a drive unit of the forklift and pulling the forklift onto the bed of the carrying vehicle by sliding the carriage along the track further comprises using the remote control unit to operate the drive unit of the forklift and drive the forklift across the bed of the carrying vehicle.

5. A method as claimed in claim 1 further comprising connecting fixing members between the forklift and the bed of the carrying vehicle.

6. In combination, a forklift truck comprising:
- a chassis;
- a pair of front wheels and at least one rear wheel;
- a drive unit mounted on the chassis;
- a lifting assembly mounted on the chassis, the lifting assembly having a pair of forks mounted on the lifting assembly and means to raise and lower the forks;
- a remote control unit to operate the lifting assembly from a position remote from the forklift truck; and
- a carrying vehicle comprising:
  - a chassis having a chassis bed;
  - a top mount system mounted on the chassis bed, the top mount system comprising a track mounted on the bed and a carriage slidable in the track, wherein the carrying vehicle has the means to slide the carriage along the track, the means comprising a ram, connected at one end to the carriage and at another end to the track, wherein the ram is a hydraulic ram; and
  - in which at least one of the forklift and the carrying vehicle comprise means to slide the carriage back and forth along the track.

7. The combination of claim 6 in which the lifting assembly has means to extend and retract a reach of the forks.

8. The combination of claim 7 in which the remote control unit further comprises means to operate the drive unit of the forklift.

9. The combination of claim 6 in which the other end of the ram is connected directly to the bed of the carrying vehicle.

10. The combination of claim 6 in which the hydraulic ram is provided with at least one hydraulic fluid coupling for connection to a complimentary hydraulic fluid coupling of a hydraulic fluid supply of the forklift.

11. The combination of claim 8 in which the hydraulic fluid couplings are quick-release couplings.

12. The combination of claim 6 in which the carriage is dimensioned to releasably engage both of the pair of forks and a fork carriage of the lift assembly of the forklift.

13. The combination of claim 6 wherein there are provided fixing members for connecting the forklift to the bed of the carrying vehicle.

* * * * *